United States Patent Office 2,843,604
Patented July 15, 1958

2,843,604

TWO STEP CONVERSION OF DELTA-TOCOPHEROL COMPOSITIONS

Orris D. Hawks, Rochester, N. Y., assignor to Eastman Kodak Company, Rochester, N. Y., a corporation of New Jersey No Drawing. Application June 8, 1955
Serial No. 514,120

2 Claims. (Cl. 260—345.5)

This invention relates to the conversion of non-α-tocopherols to α-tocopherol and more particularly to the conversion of tocopherol mixtures containing substantial amounts of δ-tocopherol to α-tocopherol.

The tocopherols that have been found in nature are α-tocopherol, β-tocopherol, γ-tocopherol and δ-tocopherol. Vegetable oils such as cottonseed oil, soybean oil, wheat germ oil, and the like, are the usual commercial sources of tocopherols. Typical of such oils is soybean oil, which is reported to have a mixed tocopherol component comprised approximately of 10% α-tocopherol, 30% δ-tocopherol and 60% γ-tocopherol. As α-tocopherol exhibits the highest degree of vitamin E biological activity, it is particularly advantageous to be able to convert the non-α-tocopherols in such oils to the higher potency α-tocopherol.

A well-known method for converting non-α-tocopherols to α-tocopherol is the chloromethylation and reduction process as disclosed in United States Patent No. 2,486,539. By subjecting, for example, soybean oil tocopherols to this conversion process, the γ-tocopherol converts to α-tocopherol in high yields. However, in the case of δ-tocopherol, the conversion to α-tocopherol is considerably less, with substantial amounts of the δ-tocopherol converting to β-tocopherol.

It is accordingly an object of this invention to convert tocopherol compositions containing substantial amounts of δ-tocopherol to compositions enhanced in α-tocopherol by a new and improved process.

It is another object of this invention to provide an improved method for increasing the vitamin E biological activity of compositions containing substantial amounts of δ-tocopherol.

It is another object of this invention to convert δ-tocopherol to α-tocopherol by a new and improved method.

It is another object of this invention to convert soybean oil tocopherols substantially to α-tocopherol by a novel and commercially feasible process.

Other objects will be apparent from the description and claims which follow.

These and other objects are attained by subjecting a tocopherol composition containing a substantial amount of δ-tocopherol to two successive chloromethylation and reduction reactions, the second chloromethylation and reduction reaction being effected directly on the tocopherol mixture resulting from the first chloromethylation and reduction reaction.

The second conversion reaction in the double conversion process is employed to convert non-α-tocopherol materials unconverted by the first conversion reaction, mainly β-tocopherol, substantially to α-tocopherol. The second conversion reaction can be effected directly on the tocopherol composition resulting from the first conversion reaction as the α-tocopherol in the reaction mixture is not substantially affected by the second conversion reaction. Accordingly, the α-tocopherol need not be separated from the non-α-tocopherols prior to the second conversion reaction.

Thus, by employing two complete and successive conversion reactions on a tocopherol composition containing substantial amounts of δ-tocopherol, the non-α-tocopherols in the original mixture, including δ-tocopherol, can be converted to α-tocopherol in excellent yield.

Delta-tocopherol, which has the formula

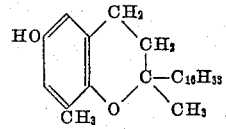

is the only known naturally-occurring tocopherol which has a single methyl radical in the aromatic ring. Accordingly, the conversion of δ-tocopherol to the more biologically active α-tocopherol, which has the formula

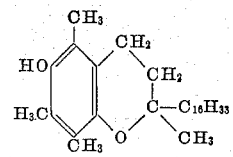

requires the addition of two methyl radicals to its aromatic nucleus. The first conversion reaction in the present process converts a substantial portion of the δ-tocopherol in the initial tocopherol composition to β-tocopherol, which has the formula

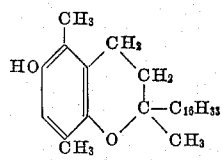

by the addition of one methyl radical into the aromatic nucleus. The reason why two methyl radicals are not added in high yield to form α-tocopherol is not known. An extended chloromethylation time during this first conversion reaction does not significantly increase the yield of α-tocopherol from the δ-tocopherol. Further, if stronger acid conditions are employed in the initial conversion reaction to force two methyl radicals into the aromatic nucleus of the δ-tocopherol, to increase the yield of α-tocopherol, polymerization or destruction of tocopherol material occurs. Thus, to obtain the maximum yield of α-tocopherol, it was the commercial practice in the conversion of tocopherol mixtures containing substantial amounts of δ-tocopherol to use chloromethylation reaction conditions which converted substantial amounts of the δ-tocopherol to β-tocopherol with a minimum of tocopherol destruction, thereafter separating any α-tocopherol present in the conversion mixture from the resulting β-tocopherol by such means as solvent partition and differential adsorption on a chromatographic adsorbent, and then converting the separated β-tocopherol to α-tocopherol in a separate chloromethylation and reduction step.

As extended reaction times and more intensive acid conditions during the chloromethylation of δ-tocopherol-containing tocopherol compositions resulted either in no further conversion to α-tocopherol or a destruction of tocopherol material, it was deemed necessary to separate the α-tocopherol from the β-tocopherol in the conversion reaction mixture to further increase the vitamin E biological activity of such tocopherol mixtures by chloromethylation and reduction reactions. However, it was found that a second conversion reaction could be employed directly on the mixed tocopherols resulting from the initial conversion reaction without a prior separation of α-tocopherol therefrom, and that the β-tocopherol in the reaction mixture could be converted to α-tocopherol with a minimum of destruction of tocopherol material. Thus, the present process is a simplified and more commercially desirable process for converting tocopherol compositions containing substantial amounts of δ-tocopherol to α-tocopherol in desired high yields.

The chloromethylation reactions can be effected by reacting the tocopherols with hydrochloric acid and either formaldehyde, preferably as an aqueous formalin solution, or paraformaldehyde. Alternatively, the chloromethylation can be effected by the use of chloromethyl ether, prepared by reacting hydrogen chloride with paraformaldehyde in methanol, or by means of dimethyl formal in conjunction with hydrogen chloride. Aqueous hydrochloric acid, hydrogen chloride gas, or their mixtures can be employed in the reaction. The chloromethylation reaction is desirably effected in an organic solvent which is inert to the reaction, such as diethyl ether, isopropyl ether, and the like. The reduction of the resulting chloromethylated tocopherol can be effected by a catalytic hydrogenation, by the addition of metallic zinc or stannous chloride to the acidic reaction mixture, or by similar well-known reduction methods. Such chloromethylation and reduction methods are well-known in the art and are described in United States Patents 2,486,539 and 2,486,542 and in other references.

Preferably, the initial conversion reaction is effected under acid conditions suitable to convert substantially all of the δ-tocopherol to β-tocopherol, or to a mixture of α-tocopherol and β-tocopherol, with a minimum of destruction of tocopherol material; and the second conversion reaction is effected under acid conditions effective to convert substantially all of the β-tocopherol to α-tocopherol without substantial destruction of the α-tocopherol. Acid concentrations that are more generally employed in the first conversion reaction include acid concentrations of about 0.2 to 0.8 N. in the organic or tocopherol-containing phase of the reaction mixture. As to the second conversion reaction, acid concentrations that are suitable for the first conversion reaction are likewise suitable for the second conversion reaction. However, acid concentrations of about 0.8 to 1.0 N. in the organic phase of the reaction mixture are preferably employed during the second conversion reaction.

While the present double conversion process is more generally employed on mixed tocopherol compositions containing substantial amounts of δ-tocopherol, the process is equally applicable to tocopherol compositions containing tocopherol components comprised solely of δ-tocopherol. Likewise, the present process can be used on synthetic tocopherol compositions containing substantial amounts of δ-tocopherol.

The invention is best illustrated by reference to a preferred embodiment thereof as detailed in the following examples, it being understood that the examples are illustrative and are not intended to limit the scope of the invention, as described herein and defined by the claims, unless otherwise indicated.

*Example 1*

A. A 40 g. sample of tocopherol derived from soybean oil, having an Emmerie and Engel value of 50% and having a tocopherol component comprised of about 10% α-tocopherol, 30% δ-tocopherol and 60% γ-tocopherol, was mixed with 100 cc. of concentrated hydrochloric acid and 460 cc. of isopropyl ether in a three-necked flask equipped with a stirrer, a reflux condenser and a gas inlet tube. Hydrogen chloride gas was passed into the mixture until the normality of the mixed organic and aqueous phases was 2.6 N and the normality of the organic phase was 0.3 N. To the reaction mixture was added 8.6 g. of paraformaldehyde. The resulting mixture was thereafter maintained at a temperature of 40° C. for a period of one hour and then cooled to about 30° C. To the resulting tocopherol composition was added 150 cc. of concentrated hydrochloric acid and the chloromethylated tocopherols reduced by slowly adding 48 g. of zinc dust. The reduction reaction was allowed to continue for about 30 minutes with the reaction temperature below about 40° C. The excess zinc was filtered out, and the tocopherol-containing organic phase separated from the aqueous phase. Analysis showed that the tocopherol component in the separated organic phase was comprised of about 70% α-tocopherol and about 30% β-tocopherol.

B. Without a further "working-up" or separation of the α-tocopherol from the β-tocopherol, the second chloromethylation and reduction reaction was effected directly on the tocopherol-containing organic phase resulting from the first chloromethylation and reduction reaction. The partly converted organic phase resulting from the first conversion reaction and 100 cc. of concentrated hydrochloric acid were added to a three-necked flask as in the first conversion reaction. Hydrogen chloride gas was passed into the mixture until the mixed phase normality was 3.8 N. and the organic phase normality was 0.9 N. To the reaction mixture was added 4.2 g. of paraformaldehyde. The resulting mixture was thereafter maintained at a temperature of 40° C. for a period of one hour and thereafter cooled to about 30° C. The chloromethylated tocopherol composition was reduced by slowly adding 150 cc. of hydrochloric acid and 48 g. of zinc dust to the mixture. The reduction reaction was allowed to continue for about 30 minutes with the reaction temperature below about 40° C. The excess zinc was filtered from the resulting reduced composition and the tocopherol-containing organic phase separated out. The tocopherol component of the organic phase was comprised of about 96.5% α-tocopherol. As determined by Emmerie Engel assay, about 90.0% of the tocopherol material in the original mixture was recovered.

*Example 2*

A. An 11.0 g. sample of substantially pure δ-tocopherol was chloromethylated in a reaction mixture comprised of 163 cc. of isopropyl ether, 29.6 cc. of concentrated hydrochloric acid, and 5.3 g. of paraformaldehyde. About 3.9 g. of hydrogen chloride gas was passed into the reaction mixture. The chloromethylation was effected at a reaction temperature of 40° C. for a period of one hour. Thereafter, the reaction mixture was cooled to about 30° C., 44 cc. of concentrated hydrochloric acid added, and the chloromethylated tocopherols reduced by slowly adding 15 g. of zinc dust. The reduction was allowed to continue for about 30 minutes at a temperature below about 40° C., and thereafter the excess zinc was filtered out. The tocopherol-containing organic phase was separated from the aqueous phase and reduced to a volume of 76 cc. by evaporation under nitrogen. The tocopherol component in the separated organic phase was comprised of about 45% α-tocopherol and about 55% β-tocopherol. Approximately 97% of the original tocopherol was recovered.

B. Without further "working-up" or separation of the α-tocopherol from the β-tocopherol, the tocopherol-containing organic phase resulting from the first conversion reaction was subjected to a second conversion reaction under essentially the same reaction conditions as the first conversion reaction. To this partly converted tocopherol-containing phase was added 1.2 g. of paraformaldehyde and 13.7 cc. of concentrated hydrochloric acid. About 1.8 g. of hydrogen chloride gas was passed into the reaction mixture. The reaction was allowed to continue for about an hour at a temperature less than 40° C. The resulting chloromethylated tocopherol composition was reduced by adding an additional 20.4 cc. of concentrated hydrochloric acid and 6.9 g. of zinc. The reduction was effected by keeping the reaction mixture at a temperature of less than about 40° C. for about 30 minutes. The excess zinc was filtered out, and a tocopherol component was separated therefrom which was comprised of about 93.6% α-tocopherol. About 94% of the original tocopherol material was recovered. Thus, substantially pure δ-tocopherol can be converted to α-tocopherol at a high yield by the present double conversion process.

While δ-tocopherol cannot be converted to α-tocopherol in desired yields by a single chloromethylation and reduction conversion reaction, even with extended reaction times and "forced chloromethylation" acid conditions, the present double conversion process can be employed very effectively to convert δ-tocopherol to α-tocopherol in high yields. Further, the present process is simplified and more commercially desirable for converting δ-tocopherol-containing compositions than prior methods employing costly separation steps.

Although the invention has been described in detail with particular reference to certain preferred embodiments, variations and modifications can be effected unless otherwise specifically indicated without departing from the spirit and scope of the invention as described hereinabove and as defined in the appended claims.

I claim:

1. The method of increasing the vitamin E biological activity of a concentrate of tocopherols containing a substantial amount of δ-tocopherol which comprises chloromethylating said concentrate with hydrochloric acid and a member selected from the group consisting of formaldehyde and paraformaldehyde; at a hydrochloric acid normality of about 0.2 to 0.8 in the tocopherol-containing phase of the reaction mixture, reducing the resulting chloromethylated tocopherols to form a mixture comprised of α-tocopherol and β-tocopherol, thereafter subjecting the resulting reduced reaction mixture to a chloromethylation reaction with hydrochloric acid and a member selected from the group consisting of formaldehyde and paraformaldehyde; at a hydrochloric acid normality of about 0.2 to 1.0 in the tocopherol-containing phase of the reaction mixture, and reducing the resulting chloromethylated tocopherol material to α-tocopherol, the second said chloromethylation and reduction reactions being effected directly on α-tocopherol and β-tocopherol in the reaction mixture resulting from the first said chloromethylation and reduction reactions.

2. The method of producing a tocopherol product exhibiting high vitamin E biological activity which comprises providing a concentrate of mixed tocopherols derived from soybean oil and containing a substantial amount of δ-tocopherol, chloromethylating said concentrate with hydrochloric acid and a member of the group consisting of formaldehyde and paraformaldehyde at a hydrochloric acid normality of about 0.2 to 0.8 in the organic phase of the reaction mixture, reducing the resulting chloromethylated tocopherols, thereafter subjecting the resulting reduced reaction mixture to a chloromethylation reaction with hydrochloric acid and a member of the group consisting of formaldehyde and paraformaldehyde at a hydrochloric acid normality of about 0.8 to 1.0 in the organic phase of the reaction mixture, and reducing the resulting chloromethylated tocopherols to α-tocopherol, the second said conversion reaction being effected directly on the tocopherol mixture resulting from the first said chloromethylation and reduction reactions without separating α-tocopherol therefrom.

References Cited in the file of this patent

UNITED STATES PATENTS

| | | |
|---|---|---|
| 2,486,539 | Weisler | Nov. 1, 1949 |
| 2,486,542 | Weisler et al. | Nov. 1, 1949 |
| 2,519,863 | Weisler | Aug. 22, 1950 |
| 2,592,628 | Weisler | Apr. 15, 1952 |